United States Patent
Kambara et al.

(10) Patent No.: US 10,377,628 B2
(45) Date of Patent: Aug. 13, 2019

(54) ENERGY STORAGE TRANSPORTATION METHOD AND ENERGY CARRIER SYSTEM

(71) Applicants: SAWAFUJI ELECTRIC CO., LTD., Gunma (JP); GIFU UNIVERSITY, Gifu (JP)

(72) Inventors: Shinji Kambara, Gifu (JP); Nobuyuki Hishinuma, Hyogo (JP); Tomonori Miura, Gunma (JP)

(73) Assignees: SAWAFUJI ELECTRIC CO., LTD., Gunma (JP); GIFU UNIVERSITY, Gifu (JP)

( * ) Notice: Subject to any disclaimer, the term of this patent is extended or adjusted under 35 U.S.C. 154(b) by 0 days.

(21) Appl. No.: 15/548,070

(22) PCT Filed: Jan. 28, 2016

(86) PCT No.: PCT/JP2016/052428
§ 371 (c)(1),
(2) Date: Aug. 1, 2017

(87) PCT Pub. No.: WO2016/132842
PCT Pub. Date: Aug. 25, 2016

(65) Prior Publication Data
US 2018/0009661 A1    Jan. 11, 2018

(30) Foreign Application Priority Data

Feb. 19, 2015 (JP) ................................. 2015-030509

(51) Int. Cl.
C01B 3/04 (2006.01)
C01B 21/40 (2006.01)
(Continued)

(52) U.S. Cl.
CPC ........... *C01B 3/047* (2013.01); *B01J 19/0066* (2013.01); *B01J 19/123* (2013.01); *C01B 21/38* (2013.01);
(Continued)

(58) Field of Classification Search
CPC ......... C01B 3/047; C01B 21/38; C01B 21/40; C01C 1/026; C01C 1/02; B01J 19/123;
(Continued)

(56) References Cited

U.S. PATENT DOCUMENTS

| 8,986,514 B2 | 3/2015 | Yamauchi et al. |
| 2012/0228120 A1* | 9/2012 | Yamauchi ............ B01J 23/8926 204/157.46 |
| 2013/0213256 A1* | 8/2013 | McAlister .............. B01J 12/007 105/62.1 |

FOREIGN PATENT DOCUMENTS

| JP | 2004-533984 | 11/2004 |
| JP | 2005-145748 | 6/2005 |
| WO | WO 2011-027864 A1 | 3/2011 |

OTHER PUBLICATIONS

Tsuji et al. "Photochemical removal of NO2 by using 172-nm Xe2 excimer lamp in N2 or air at atmospheric pressure" Journal of Hazardous Materials 162 (2009) 1025-1033 (Year: 2009).*

(Continued)

*Primary Examiner* — Amber R Orlando
*Assistant Examiner* — Syed T Iqbal
(74) *Attorney, Agent, or Firm* — Wells St. John P.S.

(57) ABSTRACT

An energy carrier system is provided that produces ammonia with high efficiency and that further produces hydrogen as final product and uses the hydrogen as energy. An energy storage transportation method is further provided that is carried out by using energy carrier system. The energy carrier system includes nitric acid production device, an ammonia production device, and hydrogen production (Continued)

device. The nitric acid production device includes a photo-reactor, a gas supply unit that supplies photo-reactor with gas to be treated containing a nitrogen oxide, water, and oxygen, and light source disposed in the photo-reactor. The light source radiates light including ultraviolet of a wavelength shorter than 175 nm. The energy storage transportation method includes nitric acid production step of producing nitric acid from a nitrogen oxide, ammonia production step of producing ammonia through reduction of nitric acid, and hydrogen production step of producing hydrogen through decomposition of the ammonia.

2 Claims, 5 Drawing Sheets

(51) Int. Cl.
  *C01C 1/02* (2006.01)
  *B01J 19/00* (2006.01)
  *B01J 19/12* (2006.01)
  *C01B 21/38* (2006.01)
(52) U.S. Cl.
  CPC ............ *C01B 21/40* (2013.01); *C01C 1/02* (2013.01); *C01C 1/026* (2013.01); *B01J 2219/0877* (2013.01); *B01J 2219/12* (2013.01); *Y02E 60/364* (2013.01); *Y02P 20/133* (2015.11)

(58) Field of Classification Search
  CPC ............ B01J 19/0066; B01J 2219/0877; B01J 2219/12; Y02P 20/133; Y02E 60/364
  See application file for complete search history.

(56) References Cited

OTHER PUBLICATIONS

J. Ye, et al., "The use of vacuum ultraviolet irradiation to oxidate SO2 and NOx for simultaneous desulfurization and denitrification", Journal of Hazardous Materials, 2014, vol. 271, pp. 89-97.
JP 2015-030509 Office Action, dated Oct. 24, 2016, with English Translation of same.
S. Kambara, et al., "Proposal of hydrogen energy carrier system using NOx in flue gas", The Japan Institute of Energy, 2015, pp. 304-305.

* cited by examiner

ENERGY STORAGE TRANSPORTATION METHOD AND ENERGY CARRIER SYSTEM

CROSS REFERENCE TO RELATED APPLICATION

This is a 35 U.S.C. § 371 application of, and claims priority to, International Application No. PCT/JP20161052428, filed on Jan. 28, 2016, which was published as WO 2016/132842 on Aug. 25, 2016, and which claims priority to JP Patent Application No. 2015-030509, which was filed on Feb. 19, 2015, the teachings of which are incorporated herein by reference.

TECHNICAL FIELD

This invention relates to an energy storage transportation method and an energy carrier system characterized in that nitric acid is produced from a nitrogen oxide, ammonia is produced from the nitric acid, and hydrogen is produced from the obtained ammonia used as its raw material.

BACKGROUND ART

There have so far been diverse attempts to more efficiently use different kinds of energies including renewable energies, for example, sunlight and wind power. The renewable energies mostly originating in natural phenomena are very variable in different seasons and different time slots of a day. Due to the fact, unmatched peaks of power demand and power supply is an issue inherently associated with such renewable energies. Large-scale photovoltaic power generation plants need vast laud areas, while wind power plants are well-suited to be built on the oceans or in coastal zones. Such plants are both remote from places where energy consumption actually occurs. Therefore, construction of power cables, which is rather costly, is another issue with renewable energies that needs to be addressed.

To address these issues, energy storage transportation methods and energy carrier systems have been developed and disclosed. A known energy storage transportation method includes steps of producing and storing a hydrogen carrier, such as ammonia, organic hydride, methanol, or dimethylethane, using electric or thermal energy; transporting the produced hydrogen carrier to a power-consuming place; and producing, if necessary, hydrogen from the hydrogen carrier. Hydrogen thus produced in the final step by the energy storage transportation method is utilized for fuel cell-powered vehicles or fuel cell power generation systems as their sources of energy.

The patent document 1 describes a method of producing hydrogen using photovoltaically generated power to actualize such an energy carrier system. The patent document 2 describes a method of synthesizing ammonia from hydrogen and nitrogen. The patent document 3 describes production of hydrogen from ammonia at 400° C. or higher temperatures by using a noble metal catalyst such as Pt, Rh, Pd, or Ru. The methods described in the patent documents 1, 2, and 3 that are combined may enable: conversion of photovoltaically generated power to hydrogen, synthesis of ammonia using the hydrogen as its raw material and storage of the ammonia as liquefied ammonia, transport of the liquefied ammonia to an energy-consuming place, conversion of the liquefied ammonia to hydrogen in the energy-consuming place, and supply of the hydrogen to fuel cell-powered vehicles or fuel cell power generation systems. The total efficiency of conversion of the renewable energy to hydrogen attainable by the combined technical means of the patent documents 1, 2, and 3 is, however, estimated to be not more than approximately 7%. There is a need for an energy carrier system with a higher efficiency of conversion.

The inventors of this invention discussed and developed the techniques to produce hydrogen from one of hydrogen carriers, ammonia, results of which are described in the patent documents 4 and 5. The hydrogen production method described in the patent document 4 irradiates hydrogen source gas containing ammonia gas with ultraviolet including light of a wavelength less than or equal to 200 nm at normal temperature to generate hydrogen gas. The hydrogen production apparatus described in the patent document 5 is equipped with a plasma reactor, a high-voltage electrode, and a grounding electrode. This apparatus produces hydrogen by generating plasma from ammonia through electric discharge between the high-voltage electrode and the grounding electrode at normal temperature and atmospheric pressure. These hydrogen production techniques may afford more efficient production of hydrogen than in the known art, and may be combined with any ammonia production method optimally selected to effectuate an energy storage transportation method and an energy carrier system.

PRIOR ART DOCUMENTS

Patent Documents

Patent Document 1: JP 2014-203274 A
Patent Document 2: JP 2013-209685 A
Patent Document 3: JP 2003-40602 A
Patent Document 4: JP 2014-24751 A
Patent Document 5: JP 2014-70012 A

SUMMARY OF THE INVENTION

Problems to be Solved by the Invention

To address these issues, this invention provides an energy storage transportation method that may allow all of the following steps to be carried out more efficiently and more inexpensively than in the known art, the steps including: producing nitric acid from a nitrogen oxide; producing ammonia from the nitric acid; and producing hydrogen from the ammonia used as its raw material. This invention further provides an energy carrier system operable to more efficiently produce hydrogen than in the known art through production of nitric acid from a nitrogen oxide and ammonia from the nitric acid.

Solutions to the Problems

The inventors devised novel nitric acid and ammonia production processes, and found out that these processes could be effectively combined with a plurality of hydrogen production processes. Then, they finally accomplished this invention. Claim 1 defines an energy storage transportation method including: a nitric acid production step of producing nitric acid from a nitrogen oxide; an ammonia production step of producing ammonia through reduction of the nitric acid; and a hydrogen production step of producing hydrogen through decomposition of the ammonia. The energy storage transportation method provided by this invention is characterized in that the nitric acid production step includes irradiating a gas to be treated including a nitrogen oxide, water, and oxygen with light including ultraviolet of a wavelength shorter than 175 nm.

Claim 2 defines the energy storage transportation method further characterized in that the ammonia production step includes: a raw material supplying step of supplying a nitric acid aqueous solution and titanium hydroxide to prepare a liquid mixture; and a reduction step of producing ammonia from the nitric acid through reduction of the titanium hydroxide. The energy storage transportation method produces one or more selected from ammonia gas, liquid ammonia and ammonia water.

Claim 3 defines the energy storage transportation method further characterized in that at least one selected from the nitric acid production step, the ammonia production step, and the hydrogen production step uses electric power generated by a renewable energy, or electric power and heat generated by a renewable energy, or electric power generated by a renewable energy and heat obtained from a thermal process. The "thermal process" in this description indicates an optional thermal process that generates waste heat, examples of which may include gas combustion, oil combustion, coal combustion, waste combustion, biomass combustion, gas engine power generation, diesel engine power generation, gasoline engine power generation, carbonization, and cement-generating processes.

This invention also provides a novel energy carrier system. Claim 4 defines an energy carrier system including: a nitric acid production device an ammonia production device, and a hydrogen production device. The nitric acid production device includes: a photo-reactor; a gas supply unit that supplies the photo-reactor with a gas to be treated including a nitrogen oxide, water, and oxygen; and a light source disposed in the photo-reactor that radiates light including ultraviolet of a wavelength shorter than 175 nm.

Claim 5 defines the energy carrier system further characterized in that the ammonia production device includes: a reactor; a nitric acid supply member; a titanium supply unit; and a light source that radiates light of a short wavelength less than or equal to 308 nm.

Claim 6 defines the energy carrier system further including: a nitric acid storage; and a nitric acid transporter characterized in that the nitric acid is used as an energy carrier.

Claim 7 defines the energy carrier system further including: an ammonia storage; and an ammonia transporter characterized in that at least one selected from ammonia gas, liquid ammonia, or ammonia water is used as an energy carrier.

Effects of the Invention

The energy storage transportation method and the energy carrier system according to this invention provide a novel technique for nitric acid production, in which a gas to be treated including a nitrogen oxide, water, and oxygen is irradiated with light of a wavelength shorter than 175 nm to produce nitric acid. The nitric acid production technique provided by this invention may produce nitric acid continuously with less reaction time, affording more efficient and more inexpensive production of nitric acid than in the known art.

In the energy storage transportation method and the energy carrier system according to this invention, nitrogen oxide; raw material for production of nitric acid, may be readily and inexpensively obtained from, for example, exhaust gas of a combustor. This method and system, therefore may afford less expensive production of nitric acid than in the known art. Besides, the nitric acid production step according to this invention removes the hazardous nitrogen oxide from the exhaust gas, serving as an environmental protection measure against exhaust gases.

The energy storage transportation method and the energy carrier system according to this invention provide an ammonia production technique in which nitric acid is reduced by titanium hydroxide. The ammonia production technique achieved by this invention may afford more efficient and more inexpensive mass production of ammonia than in the known art.

The energy storage transportation method according to this invention produces hydrogen using electric power generated by a renewable energy, or electric power and heat generated by a renewable energy, or electric power generated by a renewable energy and heat obtained from a thermal process. According to this invention the energy obtained is stored as nitric acid or ammonia and transported to a power-consuming place, so that hydrogen is produced and used for power generation at the destination. The energy storage transportation method and the energy carrier system according to this invention may succeed in storage and transport of renewable energies, consequently eliminating the risk of instability in power supply inherently associated with renewable energies.

EMBODIMENT OF THE INVENTION

[Configuration of Energy Carrier System]

Figure 1:
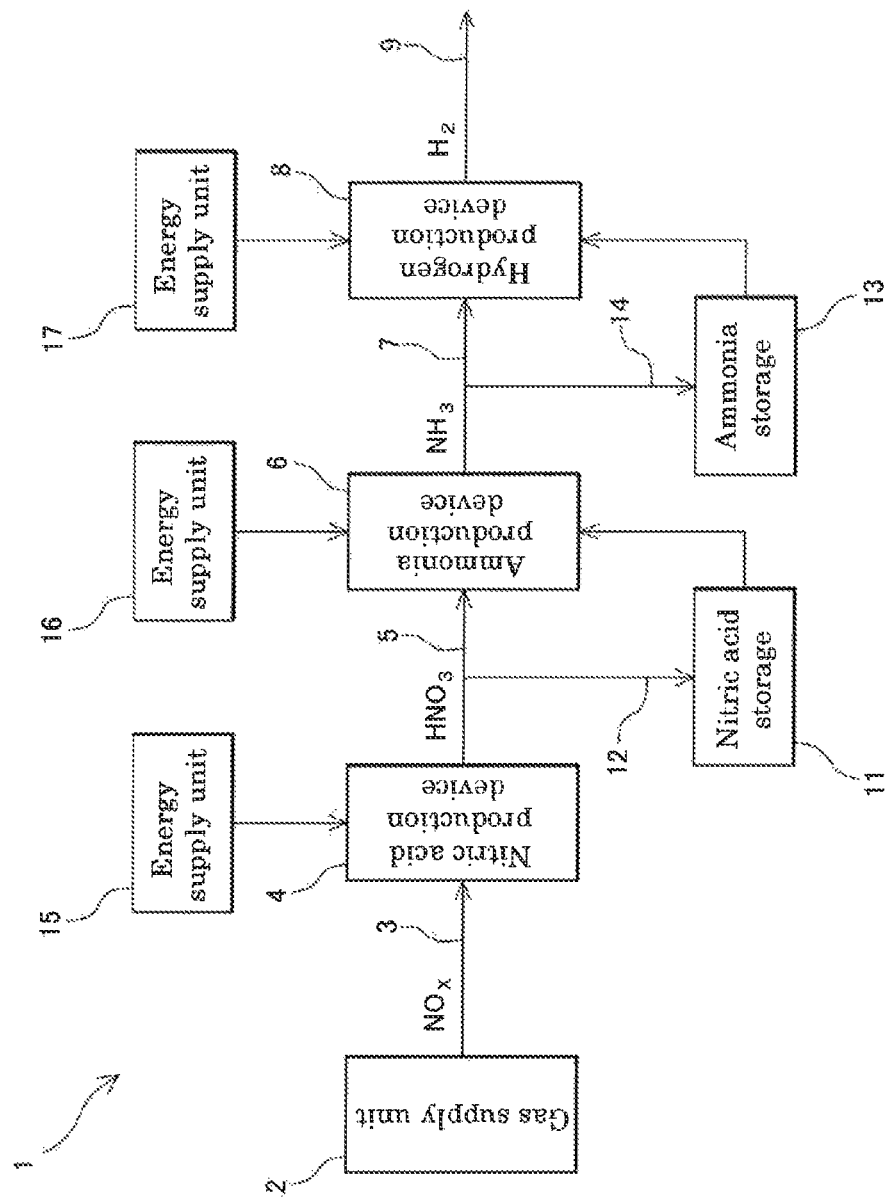
FIG. 1 is a schematic block diagram of an energy carrier system according to this invention.

A suitably configured energy carrier system according to this invention is hereinafter described referring to the accompanying drawings. FIG. 1 is a schematic block diagram of an energy carrier system 1 according to this invention. The energy carrier system 1 is equipped with a gas supply unit 2, a nitric acid production device 4, an ammonia production device 6, and a hydrogen production device 8. The gas supply unit 2 and the nitric acid production device 4 are interconnected with a gas supply channel 3. A nitric acid supply member 5 lies between the nitric acid production device 4 and the ammonia production device 6 to supply the ammonia production device 6 with nitric acid. An ammonia supply member 7 lies between the ammonia production device 6 and the hydrogen production device 8 to supply the hydrogen production device 8 with ammonia.

A nitric acid storage 11 may be interposed between the nitric acid production device 4 and the ammonia production device 6. In case the nitric acid storage is further provided, a nitric acid transporter 12 may be additionally provided to transport nitric acid from the nitric acid production device 4 to the nitric acid storage 11 and the ammonia production device 6. The nitric acid production device 4, nitric acid storage 11, and ammonia production device 6 may be disposed in proximity to one another, or any one of them may be disposed remotely from the others. Examples of the nitric acid supply member 5 and the nitric acid transporter 12 may be, respectively, a pipeline that interconnects the nitric acid production device 4 and the ammonia production device 6, and a transport device such as a vehicle.

Similarly, an ammonia storage 13 may be interposed between the ammonia production device 6 and the hydrogen production device 8. In case the ammonia storage 13 is further provided, an ammonia transporter 14 may be additionally provided to transport ammonia from the ammonia production device 6 to the ammonia storage 13 and the hydrogen production device 8. The ammonia production device 6, ammonia storage 13, and hydrogen production device 8 may be disposed in proximity to one another, or the hydrogen production device 8 may be located in an energy consuming place. Examples of the ammonia supply member 7 and the ammonia transporter 14 may be, respectively, a pipeline that interconnects the ammonia production device 6 and the hydrogen production device 8, and a transport device such as a vehicle.

To the hydrogen production device 8 is connected a hydrogen supply channel 9 for supplying produced hydrogen. Through the hydrogen supply channel 9, hydrogen is supplied to fuel cell-powered vehicles or fuel cell power generation systems.

An energy supply unit 15 is connected to the nitric acid production device 4 to supply electric energy required to produce nitric acid. An energy supply unit 16 is connected to the ammonia production device 6 to supply electric energy and thermal energy required to produce ammonia. An energy supply unit 17 is connected to the hydrogen production device 8 to supply the hydrogen production device 8 with an energy suitably required for its configuration. Examples of the energy supply units 15, 16, and 17 may include devices configured to supply a renewable energy such as sunlight, solar heat, wind power, hydraulic power, or biomass power generation.

[Gas Supply Unit]

Figure 2:
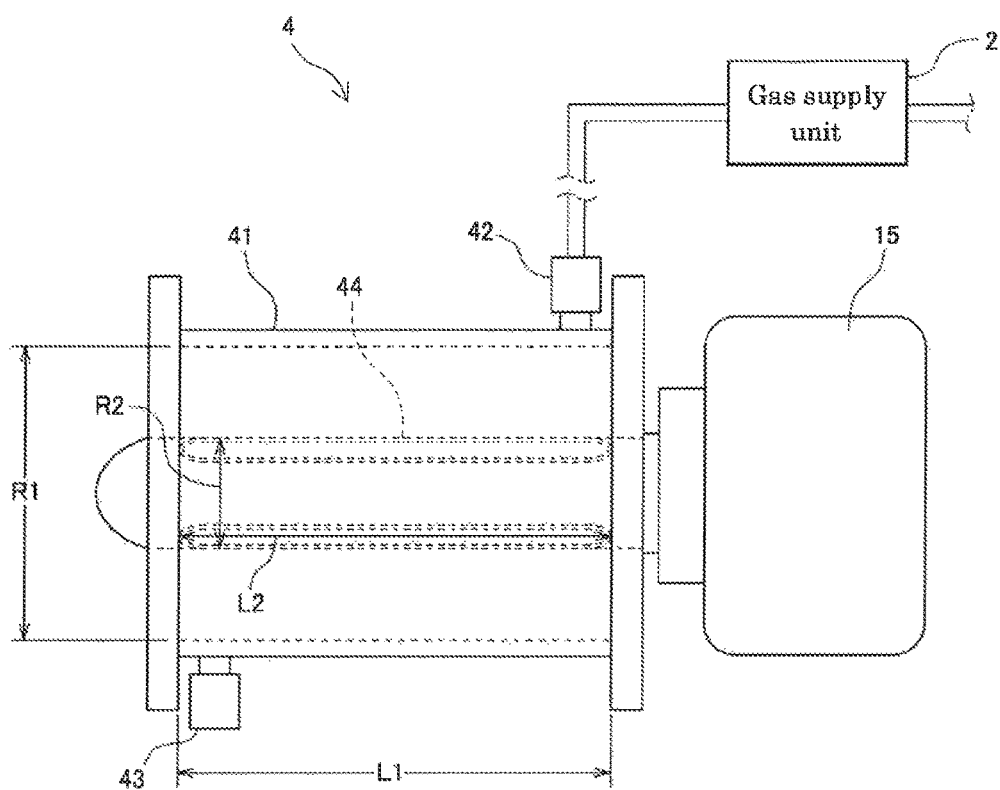
FIG. 2 is a schematic structural drawing of a nitric acid production device according to this invention.

FIG. 2 is a schematic structural drawing of the gas supply unit 2 and the nitric acid production device 4. The gas supply unit 2 according to this embodiment is connected to a combustor not illustrated in the drawing to supply the nitric acid production device 4 with nitrogen oxide-containing exhaust gas of the combustor. The exhaust gas of the combustor generally contains the nitrogen oxide, water, and oxygen, and can be directly introduced into the nitric acid production device 4 from the gas supply unit 2. For example, exhaust gas of a coal combustor utilized for coal-fueled power generation contains 200 ppm of the nitrogen oxide, 12% by volume of water, and 5% by volume of oxygen. Such a gas may be a suitable example of as the gas to be treated containing the nitrogen oxide, water, and oxygen. In case any exhaust gas containing no water or oxygen is used as the gas to be treated, the gas supply unit 2 may be equipped with an adjuster that supplies the gas supply unit 2 with water and air and adjusts its mixing ratio. Such an additional device may facilitate supply of the gas containing the nitrogen oxide, water, and oxygen. The nitrogen oxide-containing exhaust gas supplied from the gas supply unit 2 is led into the nitric acid production device 4 through the gas supply channel 3.

The combustor connected to the gas supply unit 2 may be optionally selected from exhaust gas-emitting combustors including gas combustors, oil combustors, coal combustors, waste combustors, biomass combustors, gas engines, diesel engines, gasoline engines, carbonization furnaces, and cement kilns.

[Nitric Acid Production Device]

The nitric acid production device 4 according to this embodiment includes a cylindrical photo-reactor 41, a light source 44 located at the center of the photo-reactor 41, and the energy supply unit 15 that supplies the light source with electric energy. The photo-reactor 41 has a gas supply port 42 on one end thereof to receive the gas to be treated delivered through the gas supply channel 3. The photo-reactor 41 further has a gas discharge port 43 on the other end thereof.

Any dust contained in the exhaust gas may possibly adhere to the light source 44, blocking light emission. To avoid that, preliminary dust removal is desirable. The exhaust gas of the combustor is normally passed through an electrostatic precipitator, a bag filter, or a ceramic filter for dust removal, making preliminary dust removal unnecessary. The exhaust gas can be directly delivered into the photo-reactor 41 from the gas supply unit 2 through the gas supply port 42. In case the exhaust gas contains abundant dust, the gas supply unit 2 may be equipped with a dust remover so as to facilitate supply of dust-removed exhaust gas.

In this embodiment, the light source 44 disposed in the photo-reactor 41 at its center radiates ultraviolet light of a wavelength shorter than 175 nm. Specific examples of the light source 44 may include deuterium lamps (center wavelength of 120 to 170 nm), ArBr excimer lamps (center wavelength of 165 nm), Xe excimer lamps (center wavelength of 172 nm), and ArCl excimer lamps (center wavelength of 175 nm).

According to the inventors' finding, O radicals and OH radicals are generated through particular reactions when the energy of 175 nm or less wavelength light (hereinafter, may also be referred to as photon energy) is absorbed by oxygen and water contained in the gas to be treated, and the O radicals and OH radicals greatly affect the rates of nitric acid-yielding reactions. Then, they finally identified optimal light wavelengths of the light source.

[Formula 1]

$$O_2 + h\nu(<175 \text{ nm}) \rightarrow O(1D) + O(1D) \qquad \text{Formula 1}$$

$$H_2O + h\nu \rightarrow OH + H \qquad \text{Formula 2}$$

In these formulas, h represents the Planck constant (J·s), ν represents the wave number ($S^{-1}$), and hν represents the light energy (J).

Ultraviolet of a wavelength shorter than 175 nm has photon energy greater than 7.1 eV. Oxygen molecules that absorbed ultraviolet of a wavelength shorter than 175 nm are subject to dissociation as expressed in the formula 1, generating O (1D) radicals (singlet oxygen molecules) with a remarkably high ratio activity at a high concentration.

On the other hand, water absorbs ultraviolet of a wavelength less than 175 nm at a higher rate than ultraviolet of wavelengths 185 nm and 254 nm conventionally often used. Water irradiated with ultraviolet of a wavelength of 150 nm or more and less than 175 nm generates OH radials (hydroxy radicals) expressed in the formula 2 at a higher concentration than otherwise.

The O (1D) radicals and OH radicals generated at high concentrations by irradiating oxygen and water with ultraviolet of a wavelength shorter than 175 nm markedly accelerate the nitric acid-yielding reactions illustrated below. The O (1D) radicals and OH radicals convert the nitrogen oxide, particularly nitrogen monoxide (NO) and nitrogen dioxide ($NO_2$), to nitric acid through radical gas-phase reactions of the following formulas 3 to 6. The rates of the radical gas-phase reactions are incredibly high even at normal temperature. Therefore, the nitrogen oxide contained in the exhaust gas is instantaneously converted to nitric acid while the exhaust gas supplied through the gas supply port 42 is passing through the photo-reactor 41. This may conduce to continuous and very efficient production of nitric acid. When the concentrations of O (1D) radicals and OH radicals are adequately high relative to the concentrations of NO and $NO_2$, the rate of reactions of the formulas 3 to 6 are further accelerated. To increase the concentrations of O (1D) radicals and OH radicals, water and oxygen concentrations in the exhaust gas may desirably be adequately high relative to the concentration of the nitrogen oxide.

[Formula 2]

$$NO+O(1D) \rightarrow NO_2 \quad \text{Formula 3}$$

$$NO+O(1D)+OH \rightarrow HNO_3 \quad \text{Formula 4}$$

$$NO_2+OH \rightarrow HNO_3 \quad \text{Formula 5}$$

$$NO_2+3OH \rightarrow HNO_3+H_2O \quad \text{Formula 6}$$

By irradiating oxygen with ultraviolet of a wavelength shorter than 175 nm, O (3P) oxygen atoms (triplet oxygen atoms) are generated as well as O (1D) oxygen atoms generated at a high concentration. This induces the known nitric acid-yielding reactions. As said earlier, the nitric acid-yielding reactions are aggressively accelerated by the reactions associated with O (1D) radicals and OH radicals. As a result of use of a 175 nm or less wavelength ultraviolet, the nitric acid-yielding reactions of the formulas 3 to 6 eventually become dominant.

The energy supply unit 15 that utilizes electric power produced by a renewable energy is used to supply the light source 44 with power.

The level of nitric acid production may be varied by changing the amounts of the O (1D) radicals and OH radicals generated as expressed in the formulas 1 and 2. The amounts of these radicals to be generated are changeable through adjustments of the luminous intensity of radiation from the light source 44 and/or lengths of the light source 44 and the photo-reactor 41, or by the use of more than one light source 44.

The exhaust gas introduced into the photo-reactor 41 may desirably have a temperature between normal temperature and 200° C., which may be a range of degrees at which the materials of the light source 44 are not adversely affected. The exhaust gas of the combustor is adjusted to stay at 150° C. or below before being released into the atmosphere. Alternatively, the exhaust gas, instead of being adjusted in temperature, can be directly guided to the gas supply port 42 from the gas supply unit 2. In case the exhaust gas has a temperature exceeding 200° C., the gas supply unit 2 may be equipped with a gas cooling device so as to easily regulate the temperature to 200° C. or below. The temperature of the exhaust gas may be room temperature so as to prevent any adverse impact on the rates of the radical gas-phase reactions of the formulas 3 to 6 for generating nitric acid.

[Nitric Acid Storage]

A gas cooling device may be further disposed on the downstream side of the gas discharge port 43 of the photo-reactor 41 so as to collect the produced nitric acid in liquid state. A gas cooling device may be further disposed on the downstream side of the gas discharge port 43 of the photo-reactor 41 so as to collect the produced nitric acid in liquid state. In the nitric acid storage 11 can be stored the nitric acid produced by the nitric acid production device 4. The produced nitric acid is stored in liquid state (as nitric acid aqueous solution). By further adding a heater, the concentration of nitric acid is adjustable.

[Nitric Acid Production Step]

A gas to be treated containing water, oxygen, and nitrogen monoxide as an example of the nitrogen oxide is supplied at a constant rate of flow to the photo-reactor 41 of the nitric acid production device 4. By irradiating the supplied gas with light of a Xe excimer lamp, an example of the light source 44, nitric acid is produced. The results of conducted multiple tests demonstrate that the ratio of $H_2O$ concentration to NO concentration may preferably be greater than or equal to 5, and the ratio of $O_2$ concentration to NO concentration may preferably be greater than or equal to 4. By supplying the gas to be treated in accordance with these ratios to produce nitric acid, the degree of conversion of nitrogen monoxide to nitric acid may be greater than or equal to 50%.

By supplying the light source 44 with a renewable energy, the nitric acid production step may be rephrased as a step of converting electric power produced by the renewable energy to a chemical substance, nitric acid. The nitric acid production step that eventually removes the nitrogen oxide from the exhaust gas in the form of nitric acid may also be utilized as an exhaust gas denitrification step.

[Ammonia Production Device]

Figure 3:
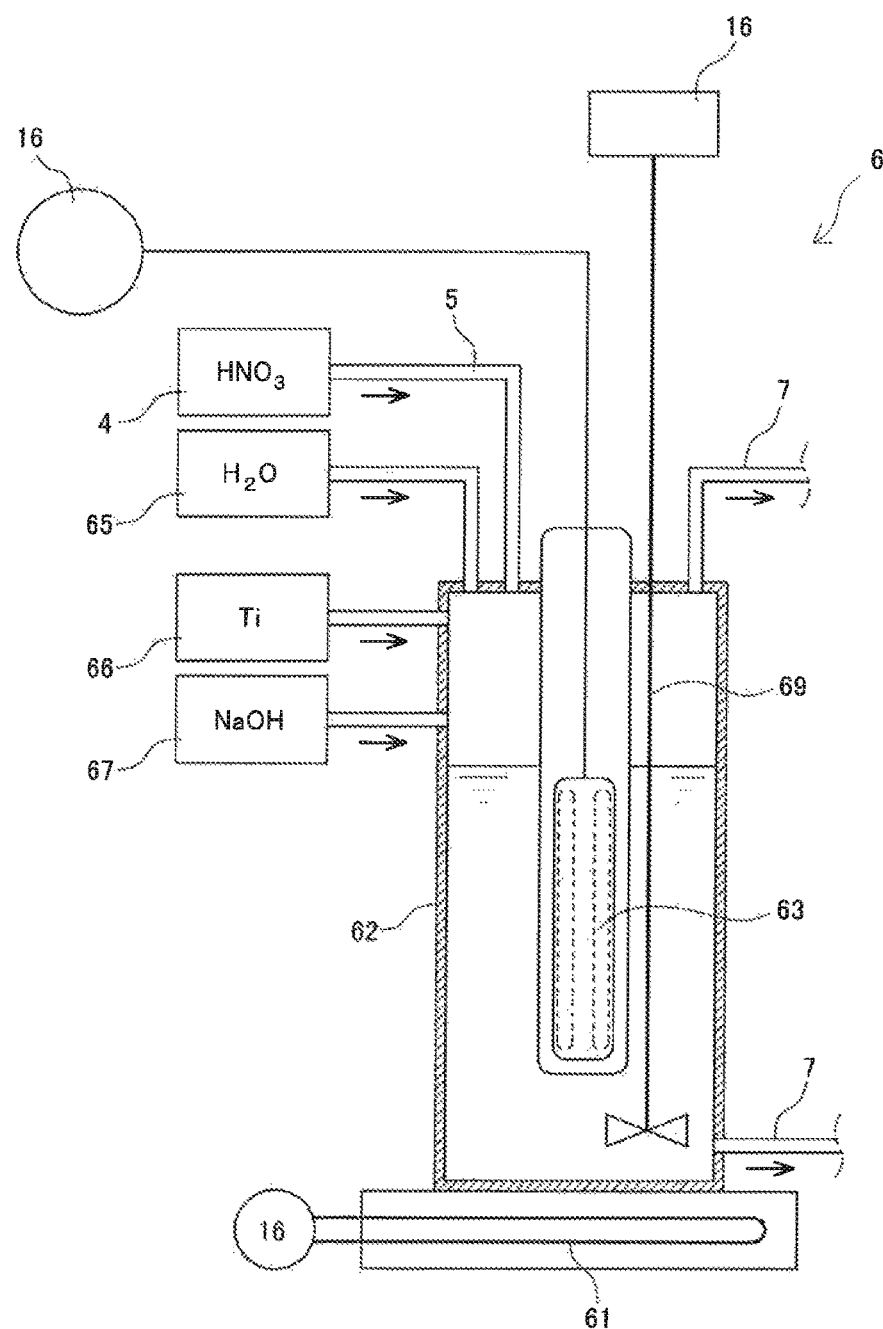
FIG. 3 is a schematic structural drawing of an ammonia production device according to this invention.

FIG. 3 is a schematic structural drawing of the ammonia production device 6. The ammonia production device 6 is supplied with the nitric acid, raw material, delivered from the nitric acid production device 4 through the nitric acid supply member 5. Instead, the ammonia production device 6 may receive nitric acid transported from the nitric acid storage 11 by the nitric acid transporter 12. Normally, storage, transport, and supply of nitric acid are performed in the form of a nitric acid aqueous solution.

The ammonia production device 6 includes a reactor 62, a titanium supply unit 66, and a light source 63. The ammonia production device 6 further includes a water supply unit 65, a sodium hydroxide supply unit 67, a heater 61, and a stirrer 69. The water supply unit 65 supplies water for concentration adjustment of the supplied nitric acid aqueous solution. The titanium supply unit 66 supplies titanium hydroxide or titanium chloride depending on specifics of the production step. Sodium hydroxide is supplied from the sodium hydroxide supply unit 67.

The reactor 62 is a cylindrical container communicating with the water supply unit 65, titanium supply unit 66, and sodium hydroxide supply unit 67. The reactor 62 has, at its upper part, an ammonia gas passage for transport of the produced ammonia gas. This passage is communicating with the ammonia supply member 7. The reactor 62 further has, at its lower part, a passage for ammonia-containing products to be released. This passage is also communicating with the ammonia supply member 7.

The light source 63 is located at the center of the reactor 62. Suitable examples of the light source 63 according to this embodiment may include an excimer light source that radiates ultraviolet having the center wavelength of 308 nm, and a low-pressure mercury lamp that radiates ultraviolet including the wavelength of 254 nm. Irradiating the liquid mixture with ultraviolet emitted from the light source 63 may enable efficient production of ammonia. Examples of the light source may include super-high pressure mercury lamps, high pressure mercury lamps, mid-pressure mercury lamps, low-pressure mercury lamps, excimer lamps filled with gases that respectively generate XeCl, $Br_2$, XeBr, $Cl_2$, HgXe, XeI, KrF, KrCl, KrBr, and ArF excimers, xenon lamps, deuterium lamps, UV-LED, ultraviolet fluorescent lamps, ArF excimer lasers, KrF excimer lasers, XeCl excimer lasers, F2 lasers, and UV solid lasers (for example, Nd-YAG with higher harmonics at 266 nm).

The heater 61 is disposed in contact with the bottom of the reactor 62 to heat the aqueous solution. The heater 61 may keep the temperature of the aqueous solution to 15° C. or may heat the aqueous solution to 100° C. Having the aqueous solution kept warm or heated to higher temperatures using the heater 61 may enable more efficient production of ammonia. The stirrer 69 is inserted in from the upper part of the reactor 62. The stirrer 69 continues to stir the aqueous solution in the reactor 62 until the reduction step is over so as to evenly distribute the dissolved substances in the aqueous solution and keep the aqueous solution at a constant temperature.

The energy supply unit 16 is used as a power source for the stirrer 69 and the light source 63, and also as a heat or power source for the heater 61. Suitable examples of the energy supply unit 16 may include devices configured to supply a renewable energy, for example, sunlight, solar heat, or wind power.

[Ammonia Production Step]

An exemplified ammonia production stop may be a step of supplying into the reactor 62 a nitric acid aqueous solution and an equivalent amount of titanium hydroxide to nitric acid. Nitric acid ions in the aqueous solution are reduced by the titanium hydroxide to generate ammonium ions. After the reduction step is over, sodium hydroxide is added to the acidulous aqueous solution containing the generated ammonium ions to neutralize or weak-alkalize the aqueous solution, so that ammonia gas is obtained.

Another exemplified ammonia production step may be a step of supplying and mixing the nitric acid aqueous solution, titanium chloride, and sodium hydroxide into the reactor 62, generating titanium hydroxide from the titanium chloride and sodium hydroxide in the liquid mixture, and feeding the nitric acid with the generated titanium hydroxide. This ammonia production step neutralizes the nitric acid aqueous solution using an equivalent amount of sodium hydroxide to nitric acid, and also reduces the nitric acid during the formation of titanium hydroxide. This ammonia production step may increase the concentration of the nitric acid aqueous solution, thereby producing a greater amount of ammonia. The step of supplying the nitric acid aqueous solution, titanium chloride, and sodium hydroxide into the reactor 62 to produce ammonia is hereinafter described in further detail.

The nitric acid aqueous solution from the nitric acid production device 4, titanium chloride from the titanium supply unit 66, and sodium hydroxide from the sodium hydroxide supply unit 67 are introduced into the reactor 62 at once. In the reactor 62, the nitric acid, water, titanium chloride, and sodium hydroxide are stirred and homogeneously mixed by the stirrer 69, and the nitric acid is neutralized as expressed in the formula 7. The titanium chloride is converted to titanium hydroxide as expressed in the formula 8. As the reaction expressed in the formula 9 proceeds, nitric acid ions in the aqueous solution are progressively reduced into ammonium ions. The overall reduction process is expressed in the formula 10.

[Formula 3]

$$HNO_3 + NaOH \rightarrow NaNO_3 + H_2O \quad \text{Formula 7}$$

$$TiCl_3 + 3NaOH \rightarrow Ti(OH)_3 + 3NaCl \quad \text{Formula 8}$$

$$NO_3^- + 10H^+ + 8Ti^{3+} + 8e \rightarrow NH_4^+ + 3H_2O + 8e \quad \text{Formula 9}$$

$$HNO_3 + 6H_2O + 8Ti(OH)_3 \rightarrow NH_3 + 8Ti(OH)_4 + H_2O \quad \text{Formula 10}$$

The formula 7 expresses a reaction that neutralizes nitric acid using sodium hydroxide and maintains pH of the liquid mixture at approximately 5 to 6. The neutralizing action of the formula 7 prevents that titanium hydroxide particles generated by the reaction of the formula 8 dissolve in the strong-acid nitric acid aqueous solution, undermining the action of the reducing agent. Further, the neutralizing action of the formula 7 may increase the concentration of nitric acid, producing a greater amount of ammonia.

The formula 8 expresses a reaction that generates titanium hydroxide, reducing agent, in the liquid mixture through reactions between titanium chloride and sodium hydroxide.

The formula 9 is an ionic formula for generating ammonium ions from nitric acid ions (half equation), expressing the mechanism of reduction. The left member of the ionic formula, $H^+$, is supplied from the nitric acid. The formula 10 expresses a reducing reaction for generating ammonia from the nitric acid. Titanium hydroxide having a strong reducing action may increase the rate of reduction of nitric acid, enabling more efficient production of ammonia.

During the reduction step, the liquid mixture is heated to a temperature higher than room temperature, for example, 100° C. under normal pressure. This may increase the rate of formation of titanium hydroxide. By irradiating the liquid mixture with short-wavelength light less than or equal to 308 nm, the photocatalytic effect may increase $H^+$ generated in the formula 9, accelerating the reduction of the formula 10.

[Ammonia Storage]

In the ammonia storage 13 can be stored ammonia produced by the ammonia production device 6. The produced ammonia may be stored in gaseous state (as ammonia gas) or liquid state (as liquid ammonia), or may be stored as ammonia water.

[Hydrogen Production Device]

The hydrogen production device 8 suitably configured to produce hydrogen in combination with the nitric acid production device 4 and the ammonia production device 6 is hereinafter described using two examples: hydrogen production device 8a and hydrogen production device 8b. The two hydrogen production devices 8a and 8b are collectively referred to as a hydrogen production device 8. The hydrogen production device 8 is supplied with ammonia, raw material, from the ammonia production device 6 through the ammonia supply member 7. The hydrogen production device 8 may be supplied with ammonia transported from the ammonia storage 13 by the ammonia transporter 14.

Figure 4:
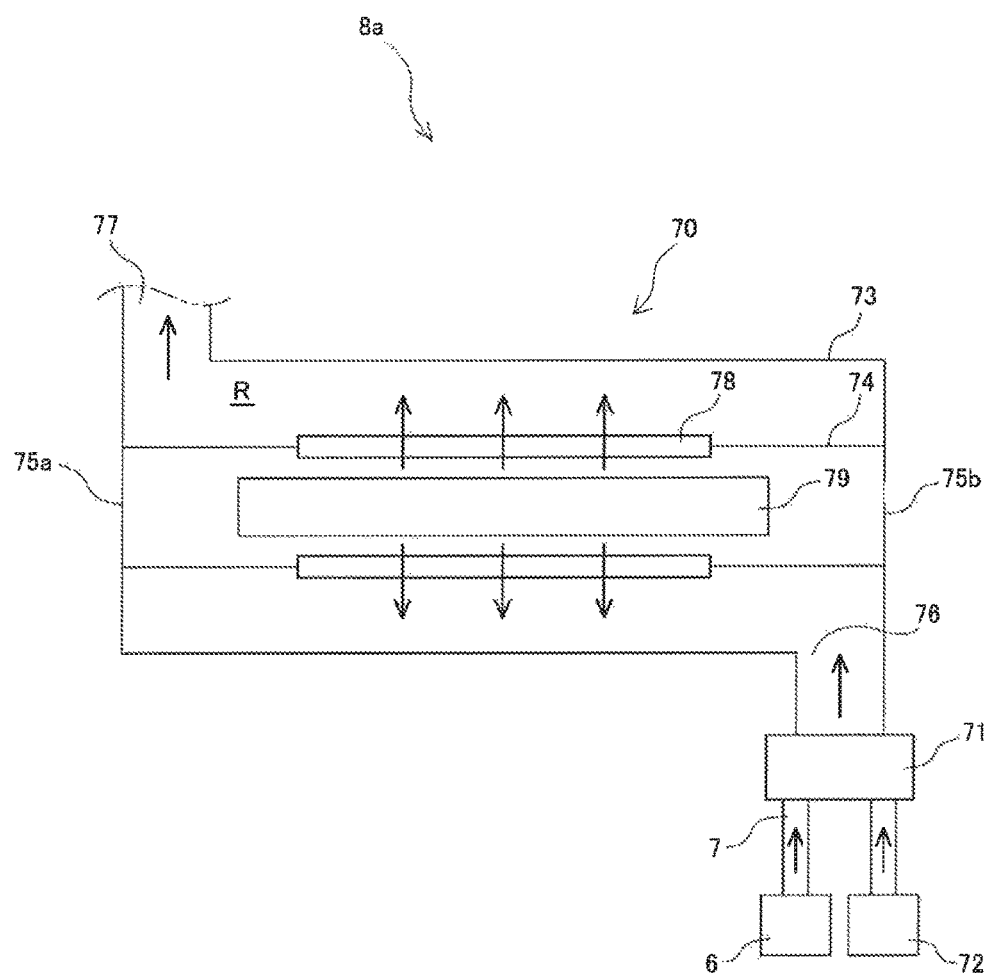
FIG. 4 is a schematic structural drawing of a hydrogen production device according to this invention.

The structure of the hydrogen production device 8a is schematically illustrated in FIG. 4. The hydrogen production device 8a includes a double-tubed gas flow component 70 having a cylindrical outer tube 73 and a cylindrical inner tube 74 disposed concentric to the outer tube 73. An annular space lies between the outer tube 73 and the inner tube 74, which forms a gas flow path R. At both ends of the gas flow component 70, side walls 75a and 75b are formed so as to sealably connect the outer and inner tubes 73 and 74. A gas inlet 76 having a gas mixer 71 is formed on one end side (right-end side in FIG. 4) of the gas flow component 70. The gas mixer 71 mixes ammonia from the ammonia production device 6 with a carrier gas including an inactive gas, such as rare or nitrogen gas, supplied from a carrier gas source 72 to obtain a mixed gas. A gas outlet 77 is formed on the other end side (left-end side in FIG. 4) of the gas flow component 70. The gas outlet 77 is connected to the hydrogen supply channel 9 through a hydrogen permeable membrane.

In the inner tube 74 of the gas flow component 70 is disposed an ultraviolet transmittable window 78 that transmits therethrough ultraviolet including light of a wavelength less than or equal to 200 nm (hereinafter, may be referred to as "specified ultraviolet"). A cylindrical quartz glass tube, for example, may be used to form the ultraviolet transmittable window 78. The inner tube 74 has, in its inside, a light source including a lamp 79 that radiates the specified ultraviolet (hereinafter, may be referred to as "specified ultraviolet radiation lamp"). The gas flow component 70 is irradiated with the specified ultraviolet emitted from the specified ultraviolet radiation lamp 79. The energy supply unit 17 is used as a power source that supplies electric power to the specified ultraviolet radiation lamp 79 and as a heat source for adjusting the temperature of the raw material mixed gas. Suitable examples of the energy supply unit 17 may include devices configured to supply a renewable energy, for example, sunlight, solar heat, or wind power.

Figure 5:
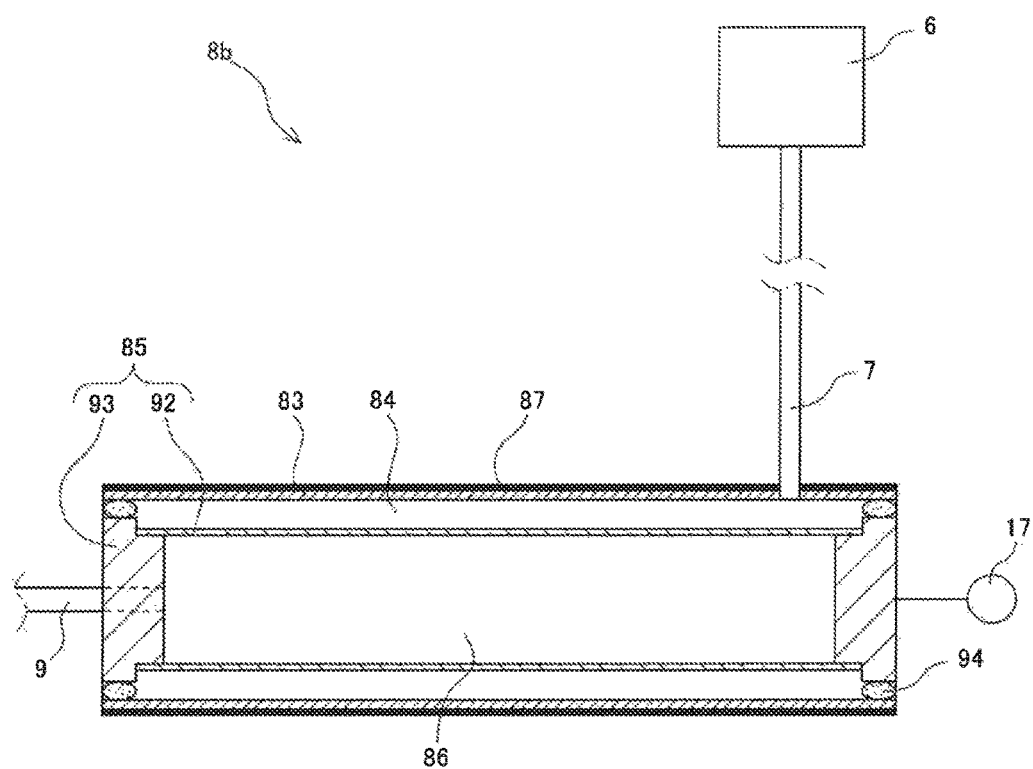
FIG. 5 is a schematic structural drawing of a hydrogen production device according to this invention.

The structure of the hydrogen production device 8b is schematically illustrated in FIG. 5. The hydrogen production device 8b includes a plasma reactor 83, a high-voltage electrode 85 housed in the plasma reactor 83, and a grounding electrode 87 disposed in contact with the outer side of the plasma reactor 83. The plasma reactor 83 is a cylindrical quartz-made reactor. The high-voltage electrode 85 includes a cylindrical hydrogen separation membrane 92 and a disc-shaped support member 93 that supports the hydrogen separation membrane 92 at both ends thereof. The hydrogen separation membrane 92 may suitably be a thin film made of a palladium alloy.

The high-voltage electrode 85 is connected to the energy supply unit 17; high-voltage pulse power source, so that a high voltage is applied to the high-voltage electrode 85. An O ring 94 is fitted in between the plasma reactor 83 and the support member 93, so that the hydrogen separation membrane 92 is located concentric to the inner wall of the plasma reactor 83. These structural features form a discharge space 84 between the inner wall of the plasma reactor 83 and the hydrogen separation membrane 92, providing a uniform interval therebetween along their whole lengths. An internal chamber 85 is formed on the inner side of the hydrogen separation membrane 92. The internal chamber 6 is an enclosed space surrounded by the hydrogen separation membrane 92 and the support member 93. The grounding electrode 87 is located concentric to the plasma reactor 83 and the hydrogen separation membrane 92. In this embodiment, ammonia supplied from the ammonia production device 6 ammonia gas, which is released into the discharge space 84 of the hydrogen production device 8b.

The hydrogen separation membrane 92 and the grounding electrode 87 are facing each other, and the quartz-made plasma reactor 83 interposed therebetween functions as a dielectric member. When a high voltage is applied to the hydrogen separation membrane 92 of the high-voltage electrode 85, dielectric barrier discharge accordingly occurs. A power source 17 applies a high voltage to the high-voltage electrode 85. The voltage applied then has a very short wavelength retention time $T_0$, 10 µs. The energy supply unit 17 illustrated in FIG. 1 is used as the power source 17. Suitable examples of the energy supply unit 17 may include devices configured to supply a renewable energy, for example, sunlight, solar heat, or wind power.

[Hydrogen Production Method]

A hydrogen production method using the hydrogen production device 8a is hereinafter described.

In the gas mixer 71, ammonia is mixed with the carrier gas including an inactive gas such as rare or nitrogen gas. The mixed gas is then introduced into the gas flow path R of the gas flow component 70 and irradiated with ultraviolet including light of a wavelength less than or equal to 200 nm. When the mixed gas is irradiated with ultraviolet under conditions meeting the formula 11, high-yield hydrogen production may become possible.

[Formula 4]

$$N(\mathrm{NH3}) = (1.223 \times Q \times C_{NH3} \times t) \times 10^{21}/(273+T) \geq 20 \times 10^{19} \quad \text{Formula 11}$$

where Q[L/min] represents the flow rate of the mixed gas introduced into the gas flow path R, $C_{NH3}$[vol %] represents the concentration of ammonia gas in the mixed gas, T[° C.] represents the gas temperature in the gas flow path R, t[sec] represents the gas residence time, and $N(\mathrm{NH}_3)$ represents the number of ammonia molecules irradiated with ultraviolet in the gas flow path R.

The hydrogen production method using the hydrogen production device 8b includes first to fourth steps described below. The first step is a step of supplying ammonia gas from the ammonia production device 6 into the discharge space 84 through the ammonia supply member 7 at a predetermined rate of flow. The second step is a step of regulating the frequency of and the voltage applied by the high-voltage pulse power source based on the flow rate of ammonia gas. The third step is a step of causing dielectric barrier discharge between the grounding electrode 87 and the hydrogen separation membrane 92 of the high-voltage electrode 85 to generate atmospheric non-equilibrium ammonia plasma in the discharge space 84. The fourth step is a step of separating hydrogen gas generated from the atmospheric non-equilibrium ammonia plasma by guiding the hydrogen gas to transmit through the hydrogen separation membrane 92 into the internal chamber 86.

In the energy storage transportation method and the energy carrier system according to this invention, the nitric acid production device 4 produces nitric acid from the nitrogen oxide, the ammonia production device 6 reduces the nitric acid into ammonia, and the hydrogen production device 8 decomposes the ammonia to produce hydrogen. Thus, highly efficient and inexpensive hydrogen production may be achieved by utilizing a renewable energy.

Working Example

Hereinafter, a working example is described, in which an energy storage transportation method was carried out by using an energy carrier system configured as described in the embodiment of this invention.

In the first step, nitric acid was produced from the nitrogen oxide in the exhaust gas by the nitric acid production device 4. The nitric acid production device 4 has one Xe excimer lamp 44, light source, at the center of the photoreactor 41 having the inner diameter (R1) of 52.9 mm and the length (L1) of 847 mm. The Xe excimer lamp 44 was a lamp capable of emitting light having the center wavelength of 172 nm. This Xe excimer lamp had the diameter (R2) of 20 mm, light emission length (L2) of 800 mm, and lamp surface output of 36 mW/cm².

In this working example, a gas to be treated supplied from the gas supply unit 2 to the nitric acid production device 4 was 150° C. and contained 1,200 ppm of nitrogen monoxide, 8.3% by volume of oxygen, and 14.9% of water. The gas was supplied at the flow rate of 20 L/min., and was irradiated with light emitted from the Xe excimer lamp 44. The degree of $HNO_3$ conversion then was 81.4%. In terms of 100% conversion, 3.3 g/h of $HNO_3$ was obtained. The nitric acid aqueous solution containing 36.9% by weight of nitric acid was obtained at the flow rate of 179 mL/h. The degree of $HNO_3$ conversion is calculated by the following formula 12.

[Formula 5]

$$\text{Degree of HNO3 conversion \%} = \frac{(\text{NO concentration at photo-reactor inlet}) - (\text{NO concentration at photo-reactor outlet})}{(\text{NO concentration at photo-reactor inlet})} \times 100 \quad \text{Formula 12}$$

The power consumption of the nitric acid production device in this working example was 185 Wh. The electric power used then may be electric power generated by using a renewable energy or electric power generated by using waste heat from a thermal process. In this working example, for continuous and steady conversion of the nitrogen oxide in the exhaust gas to nitric acid, electric power generated by a photovoltaic power generation module was stored in lithium ion batteries (BTP-1000, Sanwa Supply Co., Ltd.), and the nitric acid production device 4 was run by electric power discharged from the batteries.

In the second step, ammonia was produced by the ammonia production device 6 from the nitric acid aqueous solution obtained by the nitric acid production device 4. The ammonia production device 6 used in this working example had a reactor 62 having the inner diameter of 95 mm and the height of 175 nm. A light source 63 including one low-pressure mercury lamp was disposed at the center of the reactor 62. The low-pressure mercury lamp used then was a lamp capable of emitting ultraviolet of a wavelength including 254 nm (G8T5VH/4, Heraeus Co., Ltd.) This low-pressure mercury lamp had the diameter of 10 mm and the light emission length of 100 mm.

As the raw materials of ammonia, the ammonia production device 6 was supplied with 300 mL of the nitric acid aqueous solution containing 36.9% by weight of nitric acid which was produced by the nitric acid production device 4, a 25-fold equivalent amount of sodium hydroxide to nitric acid, and a 8-fold equivalent amount of titanium chloride to nitric acid, which were mixed to prepare a liquid mixture. The liquid mixture containing the nitric acid aqueous solution, sodium hydroxide, and titanium chloride was stirred by the stirrer 69. The liquid mixture at the room temperature of 15° C. was then irradiated with light emitted from the light source 63. The efficiency of reduction of nitric acid to ammonia then was 81%. In terms of 100% conversion, 31.9 L/h of ammonia gas was obtained. The efficiency of reduction of nitric acid to ammonia is calculated by the following formula 13.

[Formula 6]

$$\text{Efficiency of reduction \%} = \frac{\text{Post-reaction ammonia concentration of the solution (mol/L)}}{\text{Nitric acid concentration of the supplied nitric acid aqueous solution (mol/L)}} \times 100 \quad \text{Formula 13}$$

The power consumption of the ammonia production device 6 in this working example was 8 Wh. The electric power used then may be electric power generated by using a renewable energy or electric power generated by using waste heat from a thermal process. In this working example, for continuous and steady conversion of the nitric acid to ammonia, electric power generated by a photovoltaic power generation module was stored in lithium ion batteries (BTP-1000, Sanwa Supply Co., Ltd.), and the ammonia production device 6 was run by electric power discharged from the batteries.

In the third step, hydrogen was produced by the hydrogen production device 8b from the ammonia gas obtained by the ammonia production device 6. The hydrogen production device 8b had an atmospheric pressure plasma reactor 83 having the inner diameter of 45 mm and the length of 490 mm. The atmospheric pressure plasma reactor 83 had a high-voltage electrode 85 equipped with a hydrogen separation membrane 92 made of a palladium alloy. The hydrogen separation membrane 92 was located in the plasma reactor 83 concentric to and 1.5 mm away from the inner wall of the plasma reactor 83.

The material introduced into the hydrogen production device 8b this working example was ammonia gas at an approximately 100% concentration. This ammonia gas used then was produced by the ammonia production device 6 and stored in a polyvinyl fluoride-made Tedlar bag having the capacity of 2.0 L. The Tedlar bag was provided as the ammonia storage 13. The ammonia gas was supplied to the hydrogen production device 8b at the flow rate of 0.8 L/min. (48 L/h). The flow rate of hydrogen generated then was 1.2 L/min. (72 L/h), and the efficiency of conversion of ammonia to hydrogen was approximately 100%. The efficiency of conversion of ammonia to hydrogen is calculated by the following formula 14.

[Formula 7]

$$\text{Efficiency of hydrogen conversion \%} = \frac{3 \times \text{hydrogen flow rate in mol (mol/min.) at reactor outlet}}{2 \times \text{ammonia flow rate in mol (mol/min.) at reactor inlet}} \times 100 \quad \text{Formula 14}$$

The power consumption of the hydrogen production device 8b in this working example was 300 Wh. In this working example, for continuous and steady conversion of the ammonia to hydrogen, electric power generated by a photovoltaic power generation module was stored in lithium ion batteries BTP-1000, Sanwa Supply Co., Ltd.), and the hydrogen production device 8b was run by electric power discharged from the batteries.

Below are illustrated the efficiencies of conversion of the renewable energy to ammonia and hydrogen when the nitrogen oxide was used as their raw material. Table 1 shows an energy balance when the hydrogen production device 8b was run for one hour to produce 72 L of hydrogen. For production of 72 L/h of hydrogen, 48 L/h of ammonia gas was produced by the ammonia production device 6 and supplied to the hydrogen production device 8b. To produce the ammonia gas, the ammonia production device 6 was supplied with 452 mL of the 36.9% nitric acid aqueous solution and then run for 1.5 hours. To produce 452 mL of the 36.9% nitric acid aqueous solution, the nitric acid production device 4 was supplied with 20 L/min. of exhaust gas containing 1,200 ppm of a nitrogen oxide, and then run for 2.5 hours.

TABLE 1

Energy balance based on unit time (1 hour) of running the hydrogen production device

| Step No. | 1 | 2 | 3 |
|---|---|---|---|
| Device used | Nitric acid production device 4 | Ammonia production device 6 | Hydrogen production device 8b |
| Device running time (h) | 2.5 | 1.5 | 1.0 |
| Power consumption (kJ) | P1 = 1683 | P2 = 43 | P3 = 1080 |
| Product | Nitric acid aqueous solution Nitric acid concentration 36.9% | 100% ammonia gas | 100% hydrogen gas |
| Amount of production | 452 mL | 48 L | 72 L |
| Heat quantity of product (kJ) | H1 = 23 | H2 = 821 | H3 = 912 |

The power consumption in the first and second steps was all covered by the renewable energy. The efficiency of conversion of the renewable energy to ammonia using the energy carrier system of this working example may be calculated by the following formula 15. The calculated total efficiency of ammonia conversion in this working example was 47.5%. Obviously, this value is significantly higher than total efficiencies of conversion attained by the known energy storing methods.

[Formula 8]

$$\text{Total efficiency of ammonia conversion \%} = \frac{H2}{(P1+P2)} \times 100 \quad \text{Formula 15}$$

The power consumption in the third step was all covered by the renewable energy. The total efficiency of conversion of the renewable energy to hydrogen using the energy carrier system of this working example may be calculated by the following formula 16.

[Formula 9]

$$\text{Total efficiency of hydrogen conversion \%} = \frac{H3}{(P1+P2+P3)} \times 100 \quad \text{Formula 16}$$

The calculated total efficiency of hydrogen conversion in this working, example was 32.5%. Obviously, this value is significantly higher than total efficiencies of conversion conventionally attained. Thus, remarkable effects may be evident with the energy carrier system according to this invention and the energy storage transportation method using the same.

INDUSTRIAL APPLICABILITY

The energy storage transportation method and the energy carrier system according to this invention may afford storage and transport of renewable energies, consequently eliminating the risk of instability in power supply inherently associated with renewable energies. The method and the system, therefore, may be particularly useful in power generation facilities using renewable energies. The method and the system may be applicable not only to renewable energy power plants but also to other power generation facilities of various types. The method and the system may be used in any facility equipped with a nitrogen oxide-generating combustor, in which case denitrification and hydrogen production may be simultaneously carried out.

DESCRIPTION OF REFERENCE SYMBOLS

1 Energy carrier system
2 Gas supply unit
3 Gas supply channel
4 Nitric acid production device
5 Nitric acid supply member
6 Ammonia production device
7 Ammonia supply member
8, 8a, 8b Hydrogen production device
9 Hydrogen supply channel
11 Nitric acid storage
12 Nitric acid transporter
13 Ammonia storage
14 Ammonia transporter
15, 16, 17 Energy supply unit

The invention claimed is:

1. A hydrogen production method, comprising:
    a nitric acid production step of producing nitric acid from a nitrogen oxide;
    an ammonia production step of producing ammonia through reduction of the nitric acid; and
    a hydrogen production step of producing hydrogen through decomposition of the ammonia,
    the nitric acid production step comprising irradiating a gas to be treated including a nitrogen oxide, water, and oxygen with light including ultraviolet of a wavelength shorter than 175 nm,
    the ammonia production step comprising:
    a raw material supplying step of supplying a nitric acid aqueous solution and a titanium hydroxide to prepare a liquid mixture; and
    a reduction step of producing ammonia from the nitric acid through reduction of the titanium hydroxide,
    the hydrogen production method further comprising production of one or more selected from ammonia gas, liquid ammonia, or ammonia water.

2. The hydrogen production method according to claim 1, wherein
    at least one selected from the nitric acid production step, the ammonia production step, or the hydrogen production step uses electric power generated by a renewable energy, or electric power and heat generated by a renewable energy, or electric power generated by a renewable energy and heat obtained from a thermal process.

* * * * *